United States Patent
Wang et al.

(10) Patent No.: US 10,263,252 B2
(45) Date of Patent: Apr. 16, 2019

(54) NEGATIVE ELECTRODE FOR NON-AQUEOUS ELECTROLYTE SECONDARY BATTERY, AND NON-AQUEOUS ELECTROLYTE SECONDARY BATTERY

(71) Applicant: SANYO Electric Co., Ltd., Daito-shi, Osaka (JP)

(72) Inventors: Na Wang, Osaka (JP); Shinji Kasamatsu, Tokushima (JP); Yoshio Kato, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 294 days.

(21) Appl. No.: 15/318,103

(22) PCT Filed: Aug. 27, 2015

(86) PCT No.: PCT/JP2015/004309
§ 371 (c)(1),
(2) Date: Dec. 12, 2016

(87) PCT Pub. No.: WO2016/035289
PCT Pub. Date: Mar. 10, 2016

(65) Prior Publication Data
US 2017/0125806 A1    May 4, 2017

(30) Foreign Application Priority Data
Sep. 5, 2014    (JP) .................................. 2014-180921

(51) Int. Cl.
| H01M 4/133 | (2010.01) |
| H01M 4/38  | (2006.01) |
(Continued)

(52) U.S. Cl.
CPC ........... H01M 4/386 (2013.01); H01M 4/133 (2013.01); H01M 4/134 (2013.01); H01M 4/364 (2013.01);
(Continued)

(58) Field of Classification Search
CPC ...... H01M 4/133; H01M 4/134; H01M 4/364; H01M 4/386; H01M 4/48; H01M 4/485;
(Continued)

(56) References Cited

U.S. PATENT DOCUMENTS
2014/0234705 A1    8/2014    Yayamoto et al.

FOREIGN PATENT DOCUMENTS
| JP | 2010-212228 A | 9/2010 |
| JP | 2010-238426 A | 10/2010 |
(Continued)

OTHER PUBLICATIONS
International Search Report dated Sep. 29, 2015, issued in counterpart International Application No. PCT/JP2015/004309 (2 pages).

*Primary Examiner* — Brittany L Raymond
(74) *Attorney, Agent, or Firm* — Westerman, Hattori, Daniels & Adrian, LLP (57) ABSTRACT

A non-aqueous electrolyte secondary battery including a silicon material as a negative electrode active material has good discharge rate characteristics. A negative electrode according to an exemplary embodiment includes a negative-electrode current collector and a negative-electrode mixture layer formed on the current collector. The negative-electrode mixture layer contains graphite and a silicon material. A first region that extends from the surface of the mixture layer remote from the negative-electrode current collector in the thickness direction of the negative-electrode mixture layer and has a thickness equal to 40% of the thickness of the mixture layer contains a larger amount of the silicon material (Continued)

than a second region that extends from the surface of the mixture layer adjacent to the negative-electrode current collector and has a thickness equal to 40% of the thickness of the mixture layer. The first region has a lower density than the second region.

7 Claims, 1 Drawing Sheet

(51) Int. Cl.
*H01M 4/48* (2010.01)
*H01M 4/587* (2010.01)
*H01M 10/0525* (2010.01)
*H01M 4/134* (2010.01)
*H01M 4/36* (2006.01)
*H01M 4/485* (2010.01)
*H01M 10/052* (2010.01)
*H01M 4/02* (2006.01)

(52) U.S. Cl.
CPC ............. *H01M 4/48* (2013.01); *H01M 4/485* (2013.01); *H01M 4/587* (2013.01); *H01M 10/0525* (2013.01); *H01M 10/052* (2013.01); *H01M 2004/021* (2013.01)

(58) Field of Classification Search
CPC ........... H01M 4/587; H01M 2004/021; H01M 10/052; H01M 10/0525
See application file for complete search history.

(56) References Cited

FOREIGN PATENT DOCUMENTS

| | | |
|---|---|---|
| JP | 2011-233245 A | 11/2011 |
| JP | 2015-18663 A | 1/2015 |
| JP | WO2013054500 A1 | 3/2015 |
| WO | 2013/099267 A1 | 7/2013 |

NEGATIVE ELECTRODE FOR NON-AQUEOUS ELECTROLYTE SECONDARY BATTERY, AND NON-AQUEOUS ELECTROLYTE SECONDARY BATTERY

TECHNICAL FIELD

The present disclosure relates to a negative electrode for a non-aqueous electrolyte secondary battery and to a non-aqueous electrolyte secondary battery.

BACKGROUND ART

Since silicon materials, such as silicon (Si) and silicon oxide represented by $SiO_x$, can intercalate more lithium ions per unit volume than carbon materials, such as graphite, use of silicon materials in negative electrodes of lithium ion batteries or other batteries has been studied. For example, Patent Literature 1 discloses a non-aqueous electrolyte secondary battery including a mixture of $SiO_x$ and graphite as a negative electrode active material.

CITATION LIST

Patent Literature

PTL 1: Japanese Published Unexamined Patent Application No. 2011-233245

SUMMARY OF INVENTION

Technical Problem

Non-aqueous electrolyte secondary batteries having high capacity and good discharge rate characteristics have been used in applications such as hybrid vehicles, electric vehicles, and power tools. An object of the present invention is to improve the discharge rate characteristics of a high-capacity non-aqueous electrolyte secondary battery including a silicon material as a negative electrode active material.

Solution to Problem

A negative electrode for a non-aqueous electrolyte secondary battery according to one aspect of the present disclosure includes a negative-electrode current collector and a negative-electrode mixture layer formed on the current collector. The negative-electrode mixture layer contains graphite and a silicon material. A first region that extends from the surface of the mixture layer remote from the negative-electrode current collector in the thickness direction of the negative-electrode mixture layer and has a thickness equal to 40% of the thickness of the mixture layer contains a larger amount of the silicon material than a second region that extends from the surface of the mixture layer adjacent to the negative-electrode current collector and has a thickness equal to 40% of the thickness of the mixture layer. The first region has a lower density than the second region.

Advantageous Effects of Invention

According to one aspect of the present disclosure, a non-aqueous electrolyte secondary battery including a silicon material as a negative electrode active material has good discharge rate characteristics.

DESCRIPTION OF EMBODIMENTS

Hereinafter, one exemplary embodiment will be described in detail.

The drawings to which reference is made in the description of embodiments are schematically illustrated, and the dimensional ratios and the like of components in the drawings may be different from actual dimensional ratios and the like. Specific dimensional ratios and the like should be determined in consideration of the following description.

Hereinafter, unless otherwise stated, a negative electrode for a non-aqueous electrolyte secondary battery (hereinafter simply referred to as a "negative electrode") is assumed to be incorporated in a non-aqueous electrolyte secondary battery, which has been charged and discharged.

A negative electrode according to one aspect of the present disclosure includes a negative-electrode current collector and a negative-electrode mixture layer formed on the current collector. The negative-electrode mixture layer contains graphite and a silicon material. The first region of the negative-electrode mixture layer contains a larger amount of the silicon material than the second region of the mixture layer. The first region has a lower density than the second region. The first region is a region that extends from the surface of the mixture layer remote from the negative-electrode current collector in the thickness direction of the negative-electrode mixture layer and has a thickness equal to 40% of the thickness of the mixture layer. The second region is a region that extends from the surface of the mixture layer adjacent to the negative-electrode current collector and has a thickness equal to 40% of the thickness of the mixture layer.

That is, in the non-aqueous electrolyte secondary battery including the negative electrode according to one aspect of the present disclosure, the negative-electrode mixture layer includes, in order from the side of a positive electrode facing the negative electrode, the first region containing a large amount of the silicon material, and the second region containing a small amount of the silicon material than the first region or containing no silicon material. Since the volume expansion of silicon materials due to charging and discharging is larger than that of graphite, charging and discharging the non-aqueous electrolyte secondary battery generate pores between silicon particles and between silicon and graphite particles. Thus, a change in density due to a change in the porosity of each region is generated in accordance with a difference in the amount of the silicon material. That is, a change in the density of the negative-electrode mixture layer due to charging and discharging is large in the first region containing a larger amount of the silicon material, and the density of the first region becomes lower than the density of the second region.

According to the non-aqueous electrolyte secondary battery including the negative electrode, the density of the first region containing a larger amount of the silicon material decreases as a result of charging and discharging, many pores are formed between active materials in the first region, which makes it easy for an electrolyte solution to pass through the first region and thus improves lithium ion conductivity. When the lithium ion conductivity of the first region containing a large amount of the silicon material improves, high capacity and good discharge rate characteristics are obtained. Because of a low density of the first region, the diffusibility of lithium ions into the second region may also be high.

A non-aqueous electrolyte secondary battery according to an exemplary embodiment includes the negative electrode having the negative-electrode mixture layer containing graphite and a silicon material, a positive electrode, and a non-aqueous electrolyte containing a non-aqueous solvent. A separator is preferably interposed between the positive electrode and the negative electrode. Examples of the structure of the non-aqueous electrolyte secondary battery include a structure in which the non-aqueous electrolyte and an electrode body formed by winding the positive electrode and the negative electrode with the separator interposed therebetween are placed in a housing. Alternatively, other types of electrode bodies, such as a stacked-type electrode body formed by stacking the positive electrode and the negative electrode with the separator interposed therebetween, may be employed instead of the wound-type electrode body. The non-aqueous electrolyte secondary battery may be of any type, such as a cylindrical type, a prismatic type, a coin type, a button type, and a laminate type.

[Positive Electrode]

The positive electrode preferably includes, for example, a positive-electrode current collector formed of metal foil or the like, and a positive-electrode mixture layer formed on the current collector. As the positive-electrode current collector, for example, a foil made of a metal, such as aluminum, stable in the potential range of the positive electrode or a film having the surface layer made of the metal can be used. The positive-electrode mixture layer preferably contains a conductive material and a binding material in addition to a positive electrode active material. The surface of positive electrode active material particles may be coated with microparticles made of an inorganic compound, for example, an oxide, such as aluminum oxide ($Al_2O_3$), a phosphate compound, or a borate compound.

Examples of the positive electrode active material include lithium transition metal oxides containing transition metal elements, such as Co, Mn, and Ni. Examples of lithium transition metal oxides include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M: at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These lithium transition metal oxides may be used alone or in a mixture of two or more.

The conductive material is used to increase the electrical conductivity of the positive-electrode mixture layer. Examples of the conductive material include carbon materials, such as carbon black, acetylene black, Ketjenblack, and graphite. These conductive materials may be used alone or in combination of two or more.

The binding material is used to maintain good conditions of contact between the positive electrode active material and the conductive material and to increase the binding strength of the positive electrode active material and the like to the surface of the positive-electrode current collector. Examples of the binding material include fluorine-based resins, such as polytetrafluoroethylene (PTFE) and polyvinylidene fluoride (PVdF), polyimide-based resins, acrylic resins, and polyolefin-based resins. These resins may be used together with carboxymethyl cellulose sodium (CMC), polyethylene oxide (PEG), or the like. These binding materials may be used alone or in combination of two or more.

[Negative Electrode]

Figure 1:
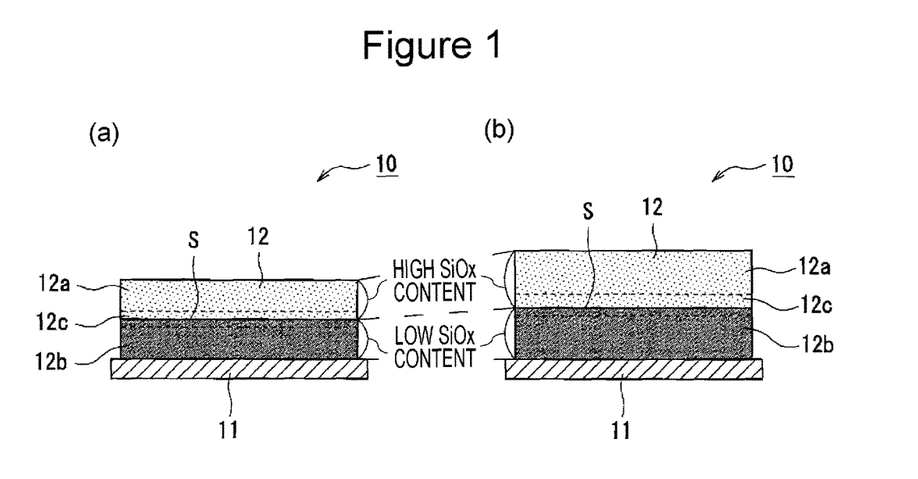
FIG. 1 illustrates sectional views of a negative electrode for a non-aqueous electrolyte secondary battery in one exemplary embodiment before and after charging and discharging.
Figure 2:
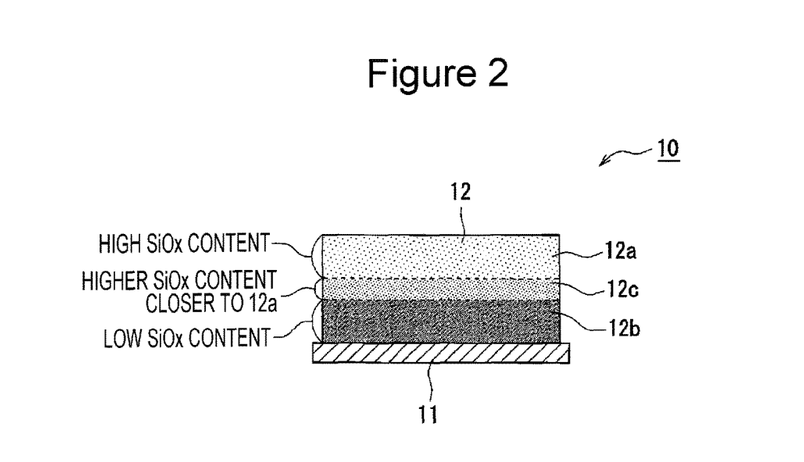
FIG. 2 illustrates a sectional view of a negative electrode for a non-aqueous electrolyte secondary battery in another exemplary embodiment.

FIG. 1 and FIG. 2 are sectional views of a negative electrode 10 according to an exemplary embodiment. FIG. 1(a) illustrates the negative electrode 10 before charging and discharging the non-aqueous electrolyte secondary battery. FIG. 1(b) and FIG. 2 illustrate the negative electrode 10 after charging and discharging.

As illustrated in FIG. 1 and FIG. 2, the negative electrode 10 includes a negative-electrode current collector 11 and a negative-electrode mixture layer 12 formed on the current collector. As the negative-electrode current collector 11, for example, a foil made of a metal, such as copper, stable in the potential range of the negative electrode or a film having the surface layer made of the metal can be used. The thickness of the negative-electrode current collector 11 is, for example, 7 to 12 µm. The negative-electrode mixture layer 12 preferably contains a binding material in addition to the negative electrode active material. The thickness of the negative-electrode mixture layer 12 is for example, 100 to 300 µm and preferably 120 to 180 µm.

As the binding material, for example, a fluorine-based resin, a polyimide-based resin, an acrylic resin, and a polyolefin-based resin can be used as in the positive electrode. When a mixture slurry is prepared by using an aqueous solvent, for example, CMC, styrene-butadiene rubber (SBR), polyacrylic acid (PAA), or polyvinyl alcohol (PVA) is preferably used.

The negative-electrode mixture layer 12 contains graphite and a silicon material as negative electrode active materials. Since silicon materials can intercalate more lithium ions per unit volume than carbon materials, such as graphite, use of silicon materials in the negative electrode active material contributes to high capacity of the battery. However, silicon materials undergo a large change in volume due to charging and discharging. Thus, a mixture of a silicon material with graphite, which undergoes a small change in volume, is used in order to obtain high capacity and maintain good cycle characteristics. Although the negative-electrode mixture layer 12 may further contain, for example, a carbon material other than graphite as a negative electrode active material, the negative electrode active material is preferably composed substantially of graphite and a silicon material.

The total amount of the silicon material in the negative-electrode mixture layer 12 is preferably 1% by weight or more and less than 20% by weight with respect to the total weight of the negative electrode active material in order to, for example, obtain a high capacity and improve the rate characteristics and the cycle characteristics. The total amount of the silicon material contained is more preferably 2% to 15% by weight and particularly preferably 3% to 10% by weight. The ratio (mixing ratio) of graphite to the silicon material is preferably 99:1 to 80:20 by weight ratio. The ratio is preferably 98:2 to 85:15 and particularly preferably 97:3 to 90:10. When the ratio of the silicon material to the total weight of the negative electrode active material is less than 1% by weight, an advantage of high capacity attributed to addition of the silicon material is small.

As graphite, graphite that has been used as a negative electrode active material for non-aqueous electrolyte secondary batteries can be used. Examples of the graphite include natural graphite, such as scaly graphite, weightive graphite, and earthy graphite; and artificial graphite, such as weightive artificial graphite (MAG) and graphitized mesophase carbon microbeads (MCMB). The average particle size of the graphite is, for example, 5 to 30 µm and more preferably 10 to 25 µm. The average particle size of the graphite as used herein refers to the particle size (volume average particle size) of primary particles at 50% of the cumulative volume in the particle-size distribution determined by a laser diffraction/scattering method (the same applies to the following description). The volume average particle size of the graphite can be determined by using, for example, "LA-750" available from HORIBA, Ltd. The BET specific surface area of the graphite is, for example, 0.5 to 10 m²/g and preferably 1 to 7 m²/g.

The silicon material is a material containing silicon (Si) and capable of intercalating more lithium ions than graphite as described above. As the silicon material, Si or a silicon oxide represented by $SiO_x$ is preferably used. Since $SiO_x$ undergoes a smaller change in volume due to the intercalation of lithium ions than Si, $SiO_x$ is particularly preferably used as the silicon material. For example, $SiO_x$ has a structure in which fine Si is dispersed in an amorphous $SiO_2$ matrix.

The average particle size of the silicon material is preferably 1 to 15 µm and more preferably 4 to 10 µm in order to increase the capacity and improve the rate characteristics and the cycle characteristics. The average particle size of the silicon material as used herein refers to the particle size (volume average particle size) of primary particles at 50% of the cumulative volume in the particle-size distribution determined by a laser diffraction/scattering method (e.g., using "LA-750" available from HORIBA, Ltd.) (the same applies to the following description). When the average particle size of the silicon material is too small, the surface area is large, which tends to increase the amount of the silicon material to react with an electrolyte to reduce the capacity. When the average particle size of the silicon material is too large, the amount of change in volume due to charging and discharging is large, which tends to degrade the cycle characteristics. A conductive layer is preferably formed on the surface of the silicon material as described below. The conductive layer does not affect the average particle size because the conductive layer is thin.

As the silicon material, $SiO_x$ (0.8≤x≤1.5) is preferably used. As mentioned above, $SiO_x$ has, for example, a structure in which fine Si is dispersed in an amorphous $SiO_2$ matrix. The observation of the $SiO_x$ particles with a transmission electron microscope (TEM) reveals the presence of Si. Silicon is preferably such that Si having a size of 200 nm or less is uniformly dispersed in a $SiO_2$ matrix. The $SiO_x$ particles may contain lithium silicate (e.g., $Li_2SiO_3$, $Li_2Si_2O_5$). In the following description, the $SiO_x$ particles are used as the silicon material.

The $SiO_x$ particles preferably have a surface coated with a conductive layer formed of a material having conductivity higher than that of $SiO_x$. The conductive material that forms the conductive layer is preferably electrochemically stable and preferably at least one selected from the group consisting of a carbon material, a metal, and a metal compound. As the carbon material, carbon black, acetylene black, Ketjenblack, graphite, and a mixture of two or more of these can be used like the conductive material of the positive-electrode mixture layer. As the metal, copper, nickel, alloys of these, and the like, which are stable in the potential range of the negative electrode, can be used. Examples of the metal compound include a copper compound and a nickel compound. In particular, a carbon material is preferably used.

The conductive layer is preferably formed to cover substantially the entire surface of the $SiO_x$ particles. The thickness of the conductive layer is preferably 1 to 200 nm and more preferably 5 to 100 nm in order to ensure the conductivity and the diffusion of lithium ions into the $SiO_x$ particles. When the conductive layer is too thin, the conductivity is low and it is difficult to uniformly coat the $SiO_x$ particles with the conductive layer. When the conductive layer is too thick, the capacity tends to be small as a result of inhibited diffusion of lithium ions into the $SiO_x$ particles. The thickness of the conductive layer can be measured by the cross-sectional observation of the particles using a scanning electron microscope (SEM), a transmission electron microscope (TEM), or the like.

The conductive layer can be formed by using a method known in the art, such as a CVD method, a sputtering method, or a plating method (electrolysis or electroless plating). When the conductive layer composed of the carbon material is formed on the surface of the $SiO_x$ particles by a CVD method, for example, the $SiO_x$ particles and hydrocarbon gas are heated in a gas phase, and carbon generated by the thermal decomposition of hydrocarbon gas is deposited on the $SiO_x$ particles. Methane gas or acetylene gas can be used as hydrocarbon gas.

The negative-electrode mixture layer 12 includes plural regions containing a different amount of $SiO_x$, namely, a different ratio of graphite to $SiO_x$, in the thickness direction of the layer. Specifically, a first region 12a that extends from the surface of the mixture layer remote from the negative-electrode current collector 11 in the thickness direction of the negative-electrode mixture layer 12 and has a thickness equal to 40% of the thickness of the mixture layer contains a larger amount of $SiO_x$ than a second region 12b that extends from the surface of the mixture layer adjacent to the negative-electrode current collector 11 and has a thickness equal to 40% of the thickness of the mixture layer. The first region 12a has a lower density than the second region 12b.

The amount of $SiO_x$ in the first region 12a is preferably 1% by weight or more and less than 40% by weight with respect to the total weight of the negative electrode active material. The amount of $SiO_x$ contained is more preferably 2% to 20% by weight and particularly preferably 5% to 15% by weight. The ratio (mixing ratio) of graphite to $SiO_x$ in the first region 12a is preferably 99:1 to 60:40 by weight ratio. The ratio is preferably 98:2 to 85:15 and particularly preferably 97:3 to 90:10. As long as the amount of $SiO_x$ in the first region 12a is within the aforementioned range, for example, high battery capacity and good rate characteristics tend to be obtained.

The second region 12b may contain only graphite as the negative electrode active material, that is, the amount of $SiO_x$ in the second region 12b may be zero. The amount of $SiO_x$ in the second region 12b is, for example, 0% by weight or more and less than 10% by weight with respect to the total weight of the negative electrode active material (provided that the amount of $SiO_x$ in the second region 12b is less than the amount of $SiO_x$ in the first region 12a). In particular, the second region 12b preferably contains $SiO_x$ in order to increase the capacity and improve the cycle characteristics. The amount of $SiO_x$ in the second region 12b is preferably less than 1% to 10% by weight and more preferably 2% to 7% by weight with respect to the total weight of the negative electrode active material. The ratio (mixing ratio) of graphite to $SiO_x$ in the second region 12a is preferably 99:1 to 90:10 and more preferably 98:2 to 93:7 by weight ratio.

The ratio of the amount of $SiO_x$ in the first region 12a to the amount of $SiO_x$ in the second region 12b (the amount of $SiO_x$ in the first region 12a/the amount of $SiO_x$ in the second region 12b) is, for example, 1.5 to 10, more preferably 2 to 7, and particularly preferably 2.5 to 5. When a difference in the amount of $SiO_x$ between the regions is within the aforementioned range, for example, high battery capacity and good rate characteristics can be realized, and good cycle characteristics are obtained. When a difference in the amount of $SiO_x$ between the regions is too large, the negative-electrode mixture layer 12 tends to fracture (undergo interfacial separation) because of a difference in the volume change of the regions due to charging and discharging.

Preferably, the amount of $SiO_x$ contained is substantially uniform at least in the first region 12a particularly from the viewpoints of high capacity, productivity, and the like. The substantially uniform as used herein means that the amount (concentration) of $SiO_x$ is determined to be substantially the same (about ±5% difference in concentration) in any part of the first region 12a. The amount of $SiO_x$ can be determined as follows: for example, preparing a cross section of an electrode plate before charging and discharging by using Cross section polisher; and determining the amount of $SiO_x$ with Electron Probe Micro Analyzer (abbreviation: EPMA) or Energy Dispersive X-ray Spectroscpy (abbreviation: EDX, EDS). Preferably, the amount of $SiO_x$ contained is also substantially uniform in the second region 12b.

In the negative-electrode mixture layer 12, the first region 12a has a lower density than the second region 12b as described above. Such a difference in density results from a difference in volume (the amount of pores between the active material particles) change during charging and discharging. This difference is caused mainly by a difference in the amount of $SiO_x$. Since an increase in volume (the amount of pores) due to charging and discharging is large in the first region 12a containing a large amount of $SiO_x$, the density of the first region 12a becomes lower than the density of the second region. Specifically, the density of the first region 12a is preferably 1.5 to 2.1 $g/cm^3$ and more preferably 1.7 to 1.9 $g/cm^3$. The density of the second region 12b is preferably 1.7 to 2.3 $g/cm^3$ and more preferably 1.9 to 2.1 $g/cm^3$. The density of each region is calculated based on the porosity of the cross section of the negative-electrode mixture layer 12 and the true density of materials of the mixture layer as described below in detail. The ratio of the density of the first region 12a to the density of the second region 12b (the density of the first region 12a/the density of the second region 12b) is, for example, 0.7 to 0.98 and preferably 0.8 to 0.95.

As illustrated in FIG. 1, the negative-electrode mixture layer 12 may have a clear boundary S (layer interface) across which the amount of $SiO_x$ changes, for example, at a substantial center in the thickness direction in a middle region 12c located between the first region 12a and the second region 12b. That is, the negative-electrode mixture layer 12 may have a two-layer structure including a layer with a low $SiO_x$ concentration and a layer with a high $SiO_x$ concentration in order from the negative-electrode current collector 11 side and having a clear interface between the layers. In addition, the negative-electrode mixture layer 12 may have a layer structure in which the amount of $SiO_x$ in the middle region 12c changes continuously. The latter structure is preferred in order to, for example, reduce or prevent a fracture of the negative-electrode mixture layer 12 due to interfacial separation. The middle region 12c has a thickness equal to 20% of the thickness of the negative-electrode mixture layer 12 across the center in the thickness direction of the mixture layer.

That is, as illustrated in FIG. 2, in the negative-electrode mixture layer 12, the amount of $SiO_x$ in the middle region 12c preferably increases from the second region 12b toward the first region 12a. That is, the middle region 12c has uneven $SiO_x$ concentration distribution in which the $SiO_x$ concentration is higher closer to the first region 12a and the $SiO_x$ concentration is lower closer to the second region 12b. The presence of such a middle region 12c, for example, eliminates a clear layer interface across which the volume suddenly changes, and reduces or prevents a fracture of the negative-electrode mixture layer 12 to improve the cycle characteristics. The layer structure illustrated in FIG. 2 can be formed by, for example, applying a negative-electrode mixture slurry layer with a low $SiO_x$ concentration to the negative-electrode current collector 11 and then, before completely drying the coating layer, applying a negative-electrode mixture slurry layer with a high $SiO_x$ concentration so as to overlap the coating layer. As illustrated in FIG. 1, the negative-electrode mixture layer 12 of the negative electrode 10 before charging and discharging the non-aqueous electrolyte secondary battery (see FIG. 1(a)) is thinner and entirely denser than the negative-electrode mixture layer 12 of the negative electrode 10 after charging and discharging ((see FIG. 1(b)). The density of the entire negative-electrode mixture layer 12 before charging and discharging is preferably 2.3 $g/cm^3$ or higher in order to, for example, increase the capacity.

[Non-Aqueous Electrolyte]

A non-aqueous electrolyte contains a non-aqueous solvent and an electrolyte salt dissolved in the non-aqueous solvent. The non-aqueous electrolyte may be a gel electrolyte and is preferably a liquid electrolyte (non-aqueous electrolyte solution). As the non-aqueous solvent, for example, esters, ethers, nitriles such as acetonitrile, amides such as dimethylformamide, and a solvent mixture of two or more of these can be used. The non-aqueous solvent may contain a halogenated product obtained by substituting at least part of hydrogen atoms of such a solvent with halogen atoms such as a fluorine atom.

Examples of the esters include cyclic carbonates, such as ethylene carbonate (EC), propylene carbonate (PC), and butylene carbonate; chain carbonates, such as dimethyl carbonate (DMC), methyl ethyl carbonate (EMC), diethyl carbonate (DEC), methylpropyl carbonate, ethylpropyl carbonate, and methyl isopropyl carbonate; cyclic carboxylates, such as γ-butyrolactone (GBL) and γ-valerolactone (GVL); and chain carboxylates, such as methyl acetate, ethyl acetate, propyl acetate, methyl propionate (MP), ethyl propionate, and γ-butyrolactone.

Examples of the ethers include cyclic ethers, such as 1,3-dioxolane, 4-methyl-1,3-dioxolane, tetrahydrofuran, 2-methyltetrahydrofuran, propylene oxide, 1,2-butyleneoxide, 1,3-dioxane, 1,4-dioxane, 1,3,5-trioxane, furan, 2-methylfuran, 1,8-cineole, and crown ether; and chain ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

As the halogenated product, for example, fluorinated cyclic carbonates, such as fluoroethylene carbonate (FEC); fluorinated chain carbonates; and fluorinated chain carboxylates, such as fluoromethyl propionate (FMP), are preferably used.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(CnF_{2n+1})_x$ (1<x<6, n is 1 or 2), $LiB_{10}Cl_{10}$, LiCl, LiBr, LiI, chloroborane lithium, lower-aliphatic lithium carboxylates, borates such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ {l and m are integers of 1 or more}. These lithium salts may be used alone or in a mixture of two or more. Of these lithium salts, $LiPF_6$ is preferably used from the viewpoints of ionic conductivity, electrochemical stability, and the like. The concentration of a lithium salt is preferably 0.8 to 1.8 mol per liter of the non-aqueous solvent.

[Separator]

An insulating porous sheet having ion permeability is used as a separator. Specific examples of the porous sheet include a microporous thin film, a woven fabric, and a non-woven fabric. Examples of suitable materials of the separator include olefin-based resins, such as polyethylene and polypropylene, and cellulose. The separator may be a stacked product having a cellulose fiber layer and a thermoplastic resin fiber layer made of olefin-based resin or the like.

EXAMPLES

The present invention will be further described below by way of Examples, but the present invention is not limited to these Examples.

Example 1

[Production of Positive Electrode]

Lithium cobalt oxide, acetylene black (HS100 available from Denka Company Limited), and polyvinylidene fluoride (PVdF) were mixed at a weight ratio of 95:2.5:2.5. To the mixture, N-methyl-2-pyrrolidone (NMP) was added as a dispersion medium. The resulting mixture was then stirred by using a mixer (T.K. HIVIS MIX available from PRIMIX Corporation) to prepare a positive-electrode mixture slurry. Next, the positive-electrode mixture slurry was applied to both sides of a positive-electrode current collector made of aluminum foil and dried, followed by rolling with a roller. As a result, a positive electrode in which positive-electrode mixture layers having a density of 3.60 g/cm³ were formed on both sides of the positive-electrode current collector was produced.

[Production of Negative Electrode]

A first mixture obtained by mixing graphite (average particle size: 20 μm, BET specific surface area: 3.5 m²/g) and $SiO_x$ (x=0.93, average particle size: 6.0 μm) having the surface coated with carbon at a weight ratio of 96:4 and a second mixture obtained by mixing the graphite and the $SiO_x$ at a weight ratio of 90:10 were used as negative electrode active materials. Two types of negative-electrode mixture slurries (hereinafter, a slurry containing the first mixture is referred to as a "first negative-electrode mixture slurry" and a slurry containing the second mixture as a "second negative-electrode mixture slurry") were prepared by adding carboxymethyl cellulose sodium (CMC) and water to the mixtures. Specifically, each mixture whose solid contents had been adjusted to 60% by weight by addition of CMC and water was stirred at a rotational speed of 40 rpm for 60 minutes by using a mixer (T.K. HIVIS MIX available from PRIMIX Corporation). Next, each slurry was produced by stirring the mixture to reach a viscosity of 1 Pa·s while water was added to the mixture. The weight ratio of the negative electrode active material to CMC in each slurry is 98:2.

Next, the first negative-electrode mixture slurry was applied to the negative-electrode current collector formed of a copper foil having a thickness of 8 μm and dried. The second negative-electrode mixture slurry was then applied to the dried first negative-electrode mixture slurry and dried. Each slurry was dried on a hot plate set at 100° C. The layers formed of two types of negative-electrode mixture slurries on the negative-electrode current collector were rolled with a roller. As a result, negative-electrode mixture layers having a density of 1.7 g/cm³ were formed on both sides of the negative-electrode current collector. The coating amount of each slurry was the same. A density of "1.7 g/cm³" of the negative-electrode mixture layer here is a press density calculated based on the coating amount of the mixture layer and the thickness of the electrode plate.

[Preparation of Non-Aqueous Electrolyte Solution]

A non-aqueous electrolyte solution was prepared by adding 1.4 mol/L of $LiPF_6$ to a solvent mixture in which ethylene carbonate (EC) and diethyl carbonate (DEC) were mixed at a weight ratio of 3:7.

[Production of Non-Aqueous Electrolyte Secondary Battery]

A wound electrode body was produced by attaching a tab to each of the electrodes and spirally winding the positive electrode and the negative electrode each having the tab with a separator interposed therebetween such that the tab was located in an outermost peripheral portion. The electrode body was inserted into a housing formed of an aluminum laminate sheet 62 mm high×35 mm wide, which was then vacuum-dried at 105° C. for 2 hours. The non-aqueous electrolyte solution was then injected, and the opening of the housing was sealed to produce a non-aqueous electrolyte secondary battery. The designed capacity of this battery is 800 mAh.

Example 2

A third negative-electrode mixture slurry containing only the graphite as a negative electrode active material, and a fourth negative-electrode mixture slurry containing a third mixture in which the graphite and the $SiO_x$ were mixed as negative electrode active materials at a weight ratio of 86:14 were prepared by the same method as in Example 1. Then, negative-electrode mixture layers having a density of 1.7 g/cm³ were formed on both sides of a negative-electrode current collector by the same method as in Example 1 using the third negative-electrode mixture slurry instead of the first negative-electrode mixture slurry and the fourth negative-electrode mixture slurry instead of the second negative-electrode mixture slurry. A non-aqueous electrolyte secondary battery was prepared in the same manner as in Example 1 except that the negative electrode having these negative-electrode mixture layers was used.

Comparative Example 1

A fifth negative-electrode mixture slurry containing a fourth mixture in which the graphite and the $SiO_x$ were mixed as negative electrode active materials at a weight ratio of 93:7 was prepared by the same method as in Example 1. Then, negative-electrode mixture layers having a density of 1.7 g/cm³ were formed on both sides of a negative-electrode current collector by the same method as in Example 1 using only the fifth negative-electrode mixture slurry instead of the first mixture slurry and the second negative-electrode mixture slurry. A non-aqueous electrolyte secondary battery was prepared in the same manner as in Example 1 except that the negative electrode having these negative-electrode mixture layers was used.

Comparative Example 2

A negative electrode and a non-aqueous electrolyte secondary battery were prepared in the same manner as in Example 1 except that the first negative-electrode mixture slurry was applied to the negative-electrode current collector after applying the second negative-electrode mixture slurry.

Comparative Example 3

A negative electrode and a non-aqueous electrolyte secondary battery were prepared in the same manner as in Example 1 except that the third negative-electrode mixture slurry was applied to the negative-electrode current collector after applying the fourth negative-electrode mixture slurry.

The non-aqueous electrolyte secondary batteries of Examples 1 and 2 and Comparative Examples 1 to 3 were evaluated by the following methods for their rate characteristics and charge/discharge cycle characteristics and for the density of the negative-electrode mixture layer after charging and discharging. The evaluation results are shown in Table 1.

[Charging/Discharging Conditions]

The battery was charged at a constant current of 0.5 It (400 mA) until the battery voltage reached 4.2 V and then charged at a constant voltage of 4.2 V until the current reached 0.05 It (40 mA). After a 10-minute pause, the battery was charged at a constant current of 1.0 It (800 mA) until the battery voltage reached 2.5 V.

[Evaluation of Rate Characteristics]

The discharge capacity in discharging at 0.2 It (160 mA) in the second cycle under the above charging/discharging conditions and the discharge capacity in discharging at 2.0 It (1600 mA) in the third cycle under the above charging/discharging conditions were determined, and the rate characteristics were obtained in accordance with formula (1) below.

Rate characteristics (%)=(discharge capacity in discharging at 1600 mA in third cycle)/(discharge capacity in discharging at 160 mA in second cycle)×100 (1)

[Evaluation of Charge/Discharge Cycle Characteristics]

The charge/discharge cycle under the above charging/discharging conditions was repeated 100 times at a temperature of 25° C. The discharge capacity in the first cycle and the discharge capacity in the 100th cycle were determined, and the capacity retention ratio after 100 cycles was obtained in accordance with formula (2) below.

Capacity retention ratio after 100 cycles (%)=(discharge capacity in 100th cycle/discharge capacity in first cycle)×100 (2)

[Evaluation of Density of Negative-Electrode Mixture Layer]

The density of the negative-electrode mixture layer was calculated in accordance with the following formula based on the porosity and true density of the negative-electrode mixture layer.

Density of mixture layer before charging and discharging=true density of mixture layer×(1−porosity of mixture layer before charging and discharging)

Density of mixture layer after charging and discharging=true density of mixture layer×(1−porosity of mixture layer after charging and discharging)

The porosity of the mixture layer was calculated by the following method.

The cross section of the mixture layer was exposed by using a cross section polisher method. The solid contents (carbon, $SiO_x$, CMC) in the mixture layer and the pores in the mixture layer were determined from the obtained cross section of the mixture layer based on the contrast in the SEM image and the reflected electron image obtained with a scanning electron microscope (SEM, JSM-6500F available from JEOL Ltd.). The porosity of the mixture layer was calculated from the SEM image by using image processing software. More specifically, the porosity of the mixture layer was calculated from the ratio of the area of the pores between active material particles in the mixture layer to the total area of the mixture layer. Furthermore, the porosity of the first region 12a and the second region 12b was calculated at five points having an area of 170 μm×100 μm that are randomly selected in an area of 600 μm×450 μm in the SEM image. The mean of the porosity was taken as the porosity of each region.

The true density of the mixture layer was calculated in accordance with the following formula.

True density of mixture layer=true density of graphite (2.26 g/cm³)×weight ratio of graphite+true density of $SiO_x$ (2.2645 g/cm³)×weight ratio of $SiO_x$+true density of CMC (1.6 g/cm³)×weight ratio of CMC

TABLE 1

| | $C:SiO_x$ | | Density of negative-electrode mixture layer before charging and discharging (g/cm³) | Density of negative-electrode mixture layer after charging and discharging (g/cm³) | | Discharge rate characteristics (%) | Capacity retention ratio (%) |
|---|---|---|---|---|---|---|---|
| | First region | Second region | Press density | First region | Second region | | |
| Example. 1 | 90:10 | 96:4 | 1.7 | 1.85 | 2.04 | 92.7 | 93.3 |
| Example. 2 | 86:14 | 100:0 | 1.7 | 1.75 | 2.12 | 93.2 | 91.7 |
| Comparative Example. 1 | 93:7 | 93:7 | 1.7 | 1.93 | 1.93 | 89.9 | 93.3 |

TABLE 1-continued

| | C:SiO$_x$ | | Density of negative-electrode mixture layer before charging and discharging (g/cm$^3$) | Density of negative-electrode mixture layer after charging and discharging (g/cm$^3$) | | Discharge rate characteristics (%) | Capacity retention ratio (%) |
|---|---|---|---|---|---|---|---|
| | First region | Second region | Press density | First region | Second region | | |
| Comparative Example. 2 | 96:4 | 90:10 | 1.7 | 2.4 | 2.02 | 1.84 | 88.0 | 93.1 |
| Comparative Example. 3 | 100:0 | 86:14 | 1.7 | 2.4 | 2.11 | 1.78 | 69.8 | 91.3 |

Compared with Comparative Examples 1 to 3, Examples 1 and 2 achieved good discharge rate characteristics. This is probably because the silicon content in the first region is higher than the silicon content in the second region, and a change in silicon volume during charging and discharging causes the density of the first region to be lower than the density of the second region. That is, many pores are generated in the first region of the surface of the electrode plate by a change in silicon volume, which makes it easy for the electrolyte solution to pass through the first region and to further diffuse into the second region. As a result, the lithium ion conductivity of the entire mixture layer improves and thus the discharge rate characteristics improve.

Example 2 has better discharge rate characteristics but a lower capacity retention ratio than Example 1. This is probably because the total volume of silicon is added to the first region, resulting in a further reduction in the density of the mixture layer in the first region due to expansion of silicon. As a result, the number of pores between active material particles gradually increases with charge/discharge cycling, which degrades the electron conductivity and reduces the capacity retention ratio.

Compared with Comparative Example 1, in Comparative Examples 2 and 3, the silicon content in the first region is lower than the silicon content in the second region. Thus, a change in silicon volume during charging and discharging causes the density of the first region to be higher than the density of the second region. This reduces the low lithium ion conductivity of the electrolyte solution in the first region and degrades the discharge rate characteristics. In particular, in Comparative Example 3, the total volume of silicon is added to the second region, which leads to a small change in carbon volume due to charging and discharging in the first region and high adhesion between particles on the surface of the electrode. This makes it most difficult for the electrolyte solution to pass through the surface and causes a large reduction in rate characteristics. In addition, the second region has the lowest density, which leads to low current collecting performance between the active material particles and between the second region and the current collector. This reduces the capacity retention ratio.

If the density of the negative-electrode mixture layer before charging and discharging is set to a low value (particularly less than 1.9 g/cm$^3$ (press density: less than 1.5 g/cm$^3$)), a reduction in the density of the mixture layer due to charging and discharging tends to increase an increase in the thickness of the battery and reduce the energy density of the battery. For example, the battery in Example 1 has a thickness of about 3.7 mm, but if the press density of the negative-electrode mixture layer is set to 1.3 g/cm$^3$ in Example 1, the battery will have a thickness of about 4.3 mm. If the density of the negative-electrode mixture layer before charging and discharging is set to a low value, the degree of improvement in discharge rate capacity by virtue of a higher silicon content in the first region than that in the second region is low.

REFERENCE SIGNS LIST

10 Negative electrode
11 Negative-electrode current collector
12 Negative-electrode mixture layer
12a First region
12b Second region
12c Middle region

The invention claimed is:

1. A negative electrode for a non-aqueous electrolyte secondary battery, comprising:
    a negative-electrode current collector; and
    a negative-electrode mixture layer formed on the current collector,
    wherein the negative-electrode mixture layer contains graphite and a silicon material,
    a first region that extends from a surface of the mixture layer remote from the negative-electrode current collector in a thickness direction of the negative-electrode mixture layer and has a thickness equal to 40% of a thickness of the mixture layer contains a larger amount of the silicon material than a second region that extends from a surface of the mixture layer adjacent to the negative-electrode current collector and has a thickness equal to 40% of the thickness of the mixture layer, and
    the first region has a lower density than the second region.

2. The negative electrode for a non-aqueous electrolyte secondary battery according to claim 1, wherein an amount of the silicon material in the first region is substantially uniform.

3. The negative electrode for a non-aqueous electrolyte secondary battery according to claim 1, wherein an amount of the silicon material in a middle region located between the first region and the second region increases from the second region toward the first region.

4. The negative electrode for a non-aqueous electrolyte secondary battery according to claim 1, wherein a total amount of the silicon material in the negative-electrode mixture layer is 1% by weight or more and less than 20% by weight with respect to a total weight of a negative electrode active material.

5. The negative electrode for a non-aqueous electrolyte secondary battery according to claim 4,
    wherein the amount of the silicon material in the first region is 1% by weight or more and less than 40% by weight with respect to the total weight of the negative electrode active material, and an amount of the silicon material in the second region is 0% by weight or more and less than 10% by weight with respect to the total weight of the negative electrode active material (provided that the amount of the silicon material in the second region is less than the amount of the silicon material in the first region).

6. A non-aqueous electrolyte secondary battery comprising the negative electrode according to claim 1, a positive electrode, and a non-aqueous electrolyte.

7. A negative electrode for a non-aqueous electrolyte secondary battery, which is a negative electrode before charging and discharging the non-aqueous electrolyte secondary battery, the negative electrode comprising:
   a negative-electrode current collector; and
   a negative-electrode mixture layer formed on the current collector,
   wherein the negative-electrode mixture layer contains graphite and a silicon material,
   a first region which is a region that extends from a surface of the mixture layer remote from the negative-electrode current collector in a thickness direction of the negative-electrode mixture layer and has a thickness equal to 40% of a thickness of the mixture layer contains a larger amount of the silicon material than a second region which is a region that extends from a surface of the mixture layer adjacent to the negative-electrode current collector and has a thickness equal to 40% of the thickness of the mixture layer, and
   an entire density of the negative-electrode mixture layer is 2.3 g/cm$^3$ or higher.

* * * * *